United States Patent
Parkin et al.

(10) Patent No.: US 9,556,742 B2
(45) Date of Patent: Jan. 31, 2017

(54) COMPOSITE AIRFOIL AND TURBINE ENGINE

(75) Inventors: Michael Parkin, S. Glastonbury, CT (US); Phillip Alexander, Colchester, CT (US); Carl Brian Klinetob, East Haddam, CT (US)

(73) Assignee: United Technologies Corporation, Hartford, CT (US)

( * ) Notice: Subject to any disclaimer, the term of this patent is extended or adjusted under 35 U.S.C. 154(b) by 1557 days.

(21) Appl. No.: 12/955,323

(22) Filed: Nov. 29, 2010

(65) Prior Publication Data

US 2012/0134839 A1    May 31, 2012

(51) Int. Cl.
| | |
|---|---|
| *F01D 5/28* | (2006.01) |
| *F01D 5/14* | (2006.01) |
| *B29C 70/24* | (2006.01) |
| *B32B 5/26* | (2006.01) |
| *B29D 99/00* | (2010.01) |

(52) U.S. Cl.
CPC ............... *F01D 5/282* (2013.01); *B29C 70/24* (2013.01); *B29D 99/0025* (2013.01); *B32B 5/26* (2013.01); *F01D 5/147* (2013.01); *B32B 2605/18* (2013.01); *F05D 2300/603* (2013.01); *F05D 2300/614* (2013.01); *Y02T 50/672* (2013.01)

(58) Field of Classification Search
CPC .......... F01D 5/147; F01D 5/282; B29C 70/24; B29D 99/0025; B32B 2603/00
USPC .......... 415/200; 416/224, 229 A, 230, 241 A
See application file for complete search history.

(56) References Cited

U.S. PATENT DOCUMENTS

| | | | | |
|---|---|---|---|---|
| 3,762,835 A | * | 10/1973 | Carlson et al. | 416/224 |
| 3,796,513 A | * | 3/1974 | Jonas | 416/224 |
| 3,883,267 A | * | 5/1975 | Baudier et al. | 416/230 |
| 4,111,606 A | * | 9/1978 | Prewo | 416/224 |
| 4,118,147 A | * | 10/1978 | Ellis | 416/230 |
| 5,279,892 A | * | 1/1994 | Baldwin et al. | 442/206 |
| 7,101,154 B2 | | 9/2006 | Dambrine et al. | |
| 7,241,112 B2 | | 7/2007 | Dambrine et al. | |
| 2008/0145615 A1 | | 6/2008 | Jacobsen et al. | |
| 2008/0187441 A1 | | 8/2008 | Schreiber | |
| 2010/0056006 A1 | | 3/2010 | Campbell | |
| 2010/0189566 A1 | | 7/2010 | Harrison | |

* cited by examiner

*Primary Examiner* — John K Fristoe, Jr.
*Assistant Examiner* — Brian O Peters
(74) *Attorney, Agent, or Firm* — Carlson, Gaskey & Olds, P.C.

(57) ABSTRACT

A composite airfoil includes a core that has a three-dimensional network of fibers. The core defines an airfoil section and a root section. A composite skin covers a portion of the core excluding the root section.

19 Claims, 3 Drawing Sheets

COMPOSITE AIRFOIL AND TURBINE ENGINE

BACKGROUND

This disclosure relates to composite airfoils. For example, the composite airfoil may be a fan blade for a turbine engine.

Airfoils, such as those used for fan blades in turbine engines, are typically formed from strong and durable metal alloys. The metal alloy provides a desired degree of strength and durability under the operating conditions of the engine and resists damage from ingested foreign objects. There are also composite blades made of reinforcement fibers in a polymeric matrix.

SUMMARY

A disclosed composite airfoil includes a core that has a three-dimensional network of fibers. The core defines an airfoil section and a root section. A composite skin covers a portion of the core excluding the root section.

In another aspect, the composite airfoil may be a fan blade that is incorporated within a fan section of a turbine engine.

An exemplary method for use with a composite airfoil includes managing foreign object impact tolerance of the composite airfoil by covering the portion of the core excluding the root section with the composite skin to thereby establish a different impact tolerance on the root section than on the portion of the core that is covered with the composite skin.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
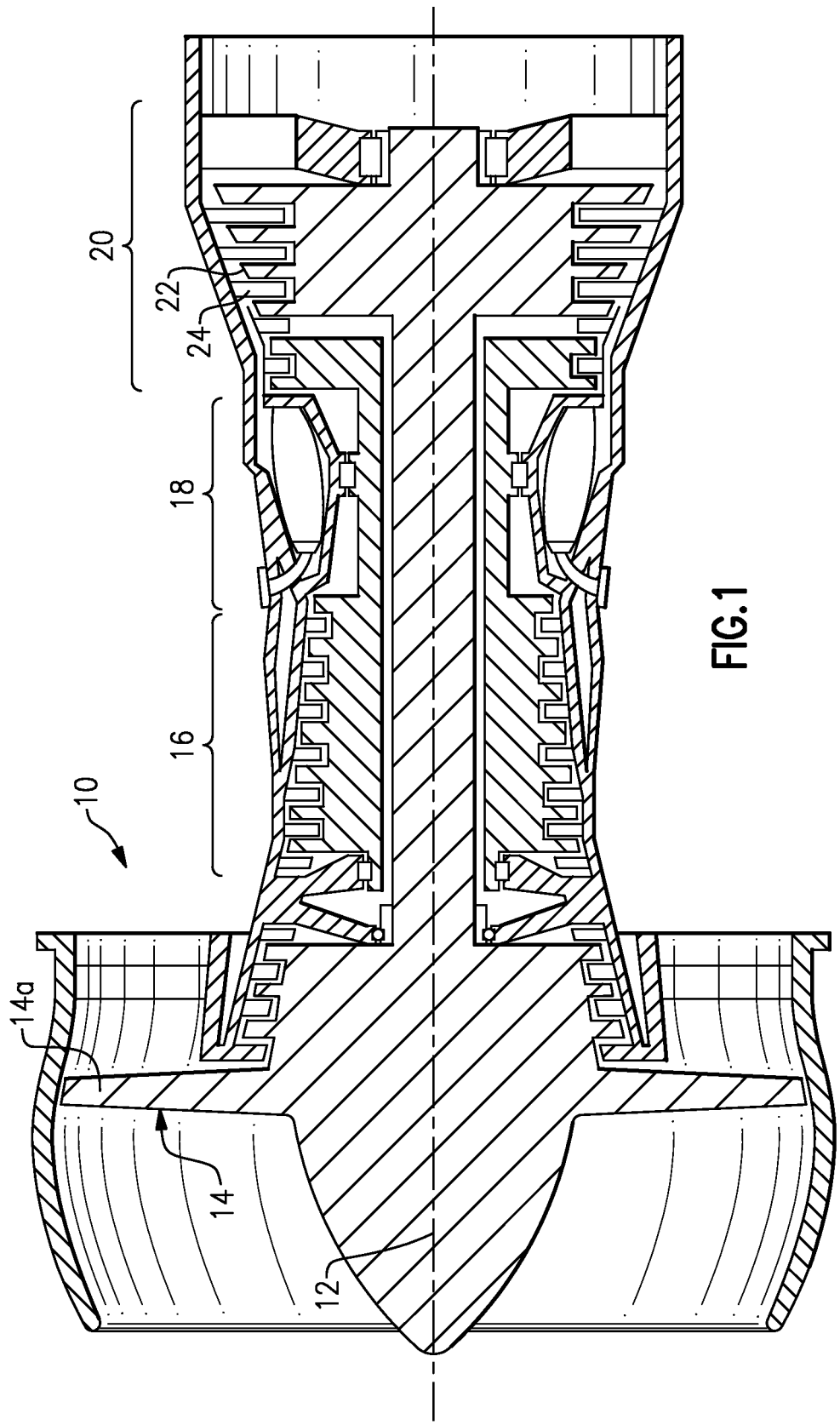
FIG. 1 illustrates an example turbine engine.
Figure 2:
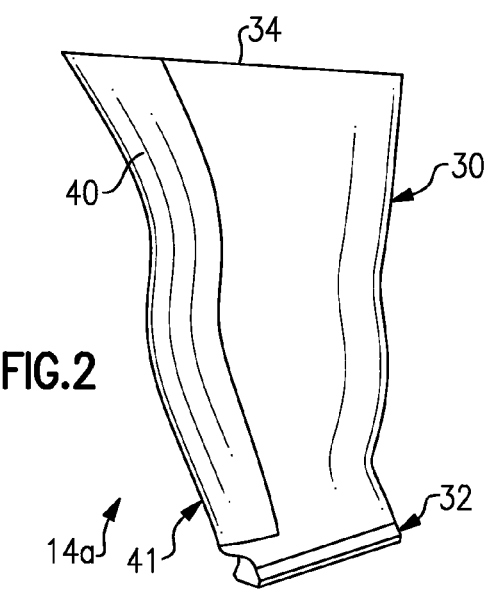
FIG. 2 illustrates a perspective view of a composite airfoil.
Figure 4:
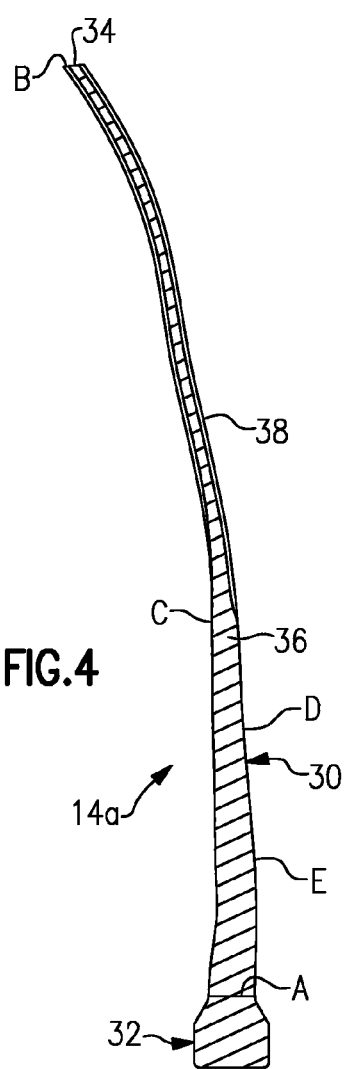
FIG. 4 illustrates a longitudinal cross section of a composite airfoil.
Figure 3:
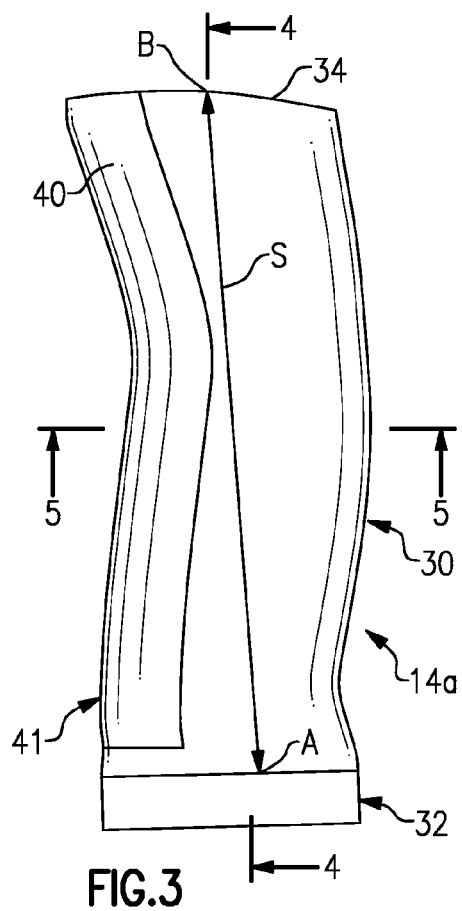
FIG. 3 illustrates a side view of a composite airfoil.
Figure 5:
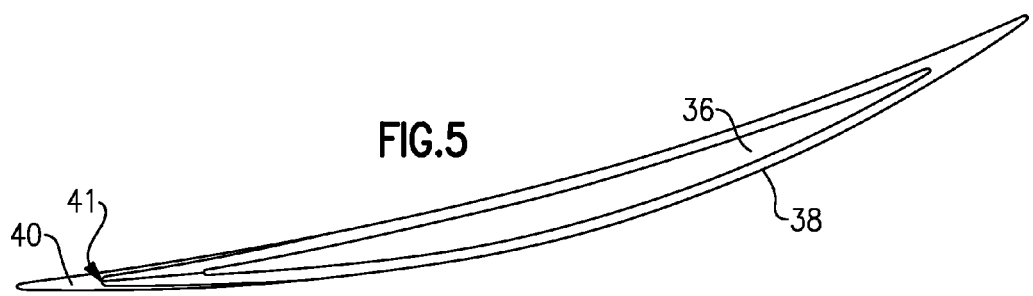
FIG. 5 illustrates a chord-wise cross section of a composite airfoil.

FIG. 1 illustrates selected portions of an example turbine engine 10, such as a gas turbine engine used for propulsion. In this example, the turbine engine 10 is circumferentially disposed about an engine center line 12. The engine 10 includes a fan 14 having fan blades 14a, a compressor section 16, a combustion section 18 and a turbine section 20 that includes turbine blades 22 and turbine vanes 24. As is known, air compressed in the compressor section 16 is mixed with fuel and burned in the combustion section 18 to produce hot gases that are expanded in the turbine section 20 to drive the fan 14 and compressor section 16. FIG. 1 is a schematic representation for illustrative purposes only and is not a limitation on the disclosed examples. Additionally, there are various types of turbine engines, many of which could benefit from the examples disclosed herein, which are not limited to the design shown.

FIGS. 2, 3, 4 and 5 illustrate, respectively, a perspective view of one of the fan blades 14a, a side view of the fan blade 14a, a longitudinal cross-section of the fan blade 14a, and a chord cross-section of the fan blade 14a. The fan blade 14a is an example of a composite airfoil. However, it is to be understood that there are other types of airfoils that could also benefit from the examples disclosed herein, which are not limited to the design shown.

The fan blade 14a includes an airfoil section 30 and a root section 32 that facilitates the mounting of the fan blade 14a within the engine 10. The root section 32 has a shape that is configured to mount the fan blade 14a in the turbine engine 10, such as a dovetail shape. Generally, the airfoil section 30 has a wing-like shape that provides a lift force via Bernoulli's principle such that one side of the airfoil section 30 is a suction side and the other side is a pressure side. The airfoil section 30 extends longitudinally between the root section 32 and a tip 34. The tip 34 is the terminal, free end of the fan blade 14a.

A core 36 of the fan blade 14a defines the airfoil shape of the airfoil section 30 and the root shape of the root section 32. A composite skin 38 covers a portion of the core 36 excluding the root section 32. That is, the composite skin 38 covers at least a portion of the airfoil section 30 but does not cover the root section 32. Optionally, the fan blade 14a may also include a glass fabric cover ply (not shown) over the composite skin 38 and core 36 to cover exposed ply ends. The fan blade 14a may also optionally include a sheath 40 over a leading edge 41 of the airfoil section 30.

Figure 6:
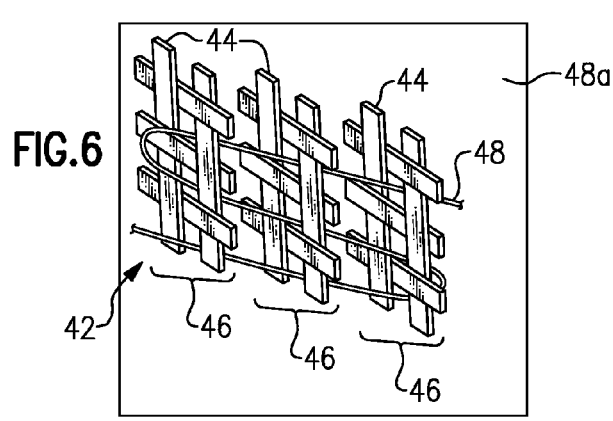
FIG. 6 illustrates a three-dimensional network of fibers.

Referring to FIG. 6, the core 36 includes a three-dimensional network of fibers 42. The three-dimensional network of fibers 42 may include fibers 44 that are interwoven to form fiber sheets 46. The fiber sheets 46 are bundled to one another by transverse fibers 48 to provide a three-dimensional fiber structure. The fibers 44 are disposed in a matrix 48a, such as a polymeric material. Although a particular network fiber structure is shown, it is to be understood that the illustration is a schematic example and that those of ordinary skill in the art will be able to recognize other suitable three-dimensional fiber structures to meet their particular needs.

Figure 7:
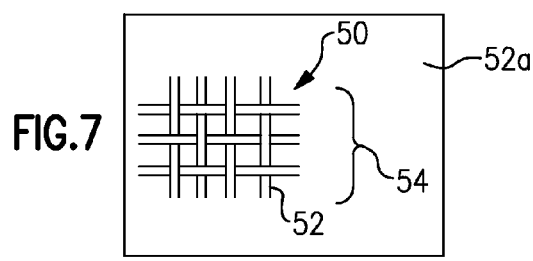
FIG. 7 illustrates a two-dimensional fiber sheet.

Referring to FIG. 7, the composite skin 38 includes one or more plies 50 of interwoven fibers 52 that form a sheet 54. As will be described in more detail below, the airfoil section 30 of the fan blade 14a may include multiple plies 50 to form the composite skin 38. The fibers 52 are disposed in a matrix 52a, such as a polymeric material, which may be the same as the polymeric material of the core 36.

The airfoil section 30 includes a span S (FIG. 3) that extends between the root section 32 at 0% span (indicated at point A) and 100% span (indicated at point B) at the tip 34. For instance, a 10% span indicates a distance from the root section 32 that is equal to 10% of the span S of the airfoil section 30.

In embodiments, the composite skin 38 partially covers the airfoil section 30. For instance, the composite skin 38 covers the airfoil section 30 with the exclusion of 0-30% span. In other examples, the composite skin 38 covers the airfoil section 30 with the exception of 0-20% span or 0-10% span, depending upon the degree of foreign object impact tolerance that is desired in the fan blade 14a. Point C (FIG. 4) indicates the 30% span position. Point D and point E indicate the 20% span and 10% span positions, respectively.

Thus, a terminal end of the composite skin 38 may be approximately at point C, point D or point E.

Figure 8:
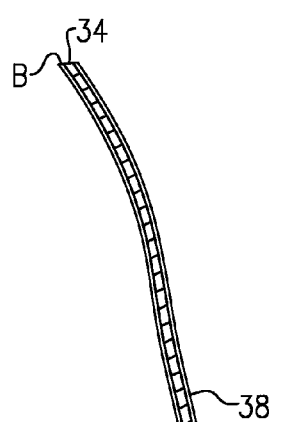
FIG. 8 illustrates another example composite airfoil.

In another embodiment shown in FIG. 8, the composite skin 38 extends fully over the airfoil section 30 from 0-100% span.

In operation, the hybrid combination in the fan blade 14a of the composite skin 38 and the core 36 allows a user to manage the foreign object impact resistance of the fan blade 14a. Generally, there is a trade-off between strength and toughness of the fan blade 14a. Strength represents the ability to resist being damaged at all upon foreign object impact. Toughness represents the ability to resist additional damage after foreign object impact. The two-dimensional composite skin 38 is strong but not tough relative to the three-dimensional core 36, which is tough but not as strong. Therefore, the fan blade 14a is designed to manage foreign object impact tolerance to thereby establish a different impact tolerance on the root section 32 than on the portion of the core 36 that is covered with the composite skin 38.

The exclusion of the composite skin 38 over portions (optionally) of the airfoil section 30 and the root section 32 allows greater toughness at the root section 32 near the junction of the root section 32 and the airfoil section 30. That is, the three dimensional network of fibers 42 of the core 36 is better able to absorb energy from impact than the two-dimensional fibers 52 of the composite skin 38, which may delaminate. In areas that have the core 36 and the composite skin 38, there is a higher degree of initial impact resistance because of the better in-plane strength of the composite skin 38 compared to the three-dimensional fiber network of the core 36. Therefore, in high stress areas, such as near the junction of the root section 32 and the airfoil section 30, the composite skin 38 may be excluded to eliminate delamination of the composite skin 38.

Figure 9:
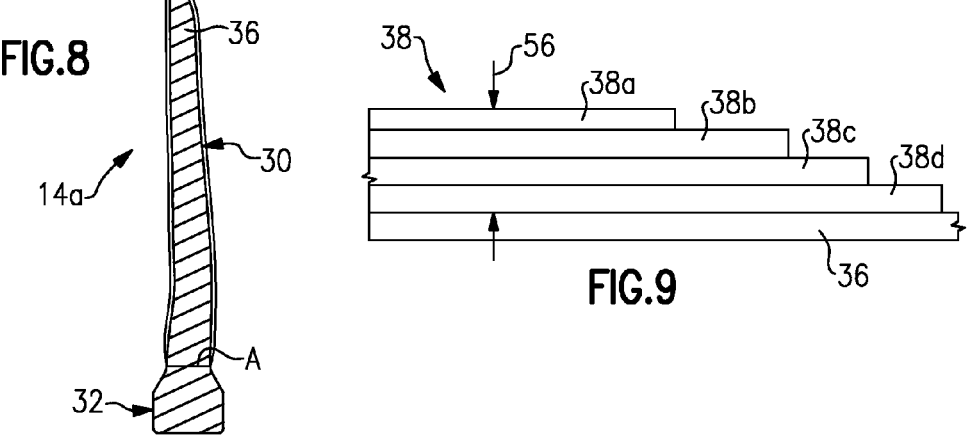
FIG. 9 illustrates tapering of a composite skin.

FIG. 9 illustrates an example of the terminal end of the composite skin 38 that includes a plurality of skin plies 38a-d that cover the underlying core 36. In order to end the coverage of the composite skin 38 over the core 36, the plies 38a-d progressively terminate in length such that the number of plies 38a-d sequentially reduces until there are no plies that remain to cover the core 38. In this manner, there is a non-abrupt termination of the composite skin 38 over the core 36.

Additionally, the reinforcing fibers 52 of the skin plies 38a-d may differ from one another. For instance, the fibers 52 of an inner layer 38d with regard to the core 36 may be different from the fibers of an outer layer 38a of the composite skin 38. In embodiments, the fibers 52 of the inner layer 38b may be high tensile modulus fibers and the fibers 52 of the outer layer 38a may be lower tensile modulus fibers.

In some embodiments, the fibers 52 of the plies 38a-d may sequentially increase in tensile modulus from the outer layer 38a to the inner layer 38d. Additionally, or as an alternative, the fibers 52 of the plies 38a-d may differ in at least one of composition or nominal physical properties. As an example, the fibers 52 may be of the same nominal composition but may have different physical properties, such as tensile modulus. In other embodiments, a first type of fiber may be used in the ply 38d and a different type of fiber may be used in the ply 38a. For instance, boron fibers may be used in the ply 38d and carbon fibers may be used in the ply 38a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite airfoil comprising:
   a core including a three-dimensional network of fibers, the core defining an airfoil section and a root section; and
   a composite skin covering a portion of the core excluding the root section.

2. The composite airfoil as recited in claim 1, wherein the composite skin partially covers the airfoil section.

3. The composite airfoil as recited in claim 1, wherein the composite skin fully covers the airfoil section.

4. The composite airfoil as recited in claim 1, wherein the airfoil section includes a span extending longitudinally from a 0% span at the root section to a 100% span at a tip, and the composite skin covers the airfoil section excluding 0-10% span.

5. The composite airfoil as recited in claim 1, wherein the airfoil section includes a span extending longitudinally from a 0% span at the root section to a 100% span at a tip, and the composite skin covers the airfoil section excluding 0-20% span.

6. The composite airfoil as recited in claim 1, wherein the airfoil section includes a span extending longitudinally from a 0% span at the root section to a 100% span at a tip, and the composite skin covers the airfoil section excluding 0-30% span.

7. The composite airfoil as recited in claim 1, wherein the composite skin includes a through-plane thickness that tapers toward the root section.

8. The composite airfoil as recited in claim 1, wherein the composite skin includes a first skin ply having a first tensile modulus and a second skin ply having a second tensile modulus that is different from the first tensile modulus.

9. The composite airfoil as recited in claim 8, wherein the first skin ply is an inner skin ply with regard to the core and the second skin ply is an outer skin ply with regard to the first skin ply and the core, and the first tensile modulus is greater than the second tensile modulus.

10. The composite airfoil as recited in claim 1, wherein the composite skin includes a first skin ply and a second skin ply each having reinforcement fibers, and the reinforcement fibers of the first skin ply are different than the reinforcement fibers of the second ply in at least one of composition and nominal properties.

11. The composite airfoil as recited in claim 1, wherein the composite skin is a two-dimensional, fiber-reinforced composite skin.

12. The composite airfoil as recited in claim 1, wherein the root section has a greater toughness than the portion of the core covered by the skin, the toughness representing an ability to resist damage after a foreign object impact.

13. A turbine engine comprising:
a compressor section;
a turbine section in communication with the compressor section; and
a fan section in communication with the compressor section, the fan section having a fan with a plurality of fan blades, each fan blade comprising a composite airfoil that includes a core having a three-dimensional network of fibers, the core defining an airfoil section and a root section, and a composite skin covering a portion of the core excluding the root section.

14. The turbine engine as recited in claim 13, wherein the root section has a greater toughness than the portion of the core covered by the skin, the toughness representing an ability to resist damage after a foreign object impact.

15. A method for use with a composite airfoil that includes a core having a three-dimensional network of fibers, the core defining an airfoil section and a root section, the method comprising:
managing foreign object impact tolerance of the composite airfoil by covering a portion of the core excluding the root section with a composite skin to thereby establish a different impact tolerance on the root section than on the portion of the core that is covered with the composite skin.

16. The method as recited in claim 15, wherein the airfoil section includes a span extending longitudinally from a 0% span at the root section to a 100% span at a tip, and including covering the airfoil section with the composite skin excluding 0-10% span.

17. The method as recited in claim 15, wherein the airfoil section includes a span extending longitudinally from a 0% span at the root section to a 100% span at a tip, and including covering the airfoil section excluding 0-20% span.

18. The method as recited in claim 15, wherein the airfoil section includes a span extending longitudinally from a 0% span at the root section to a 100% span at a tip, and including covering the airfoil section excluding 0-30% span.

19. The method as recited in claim 15, wherein the root section has a greater toughness than the portion of the core covered by the skin, the toughness representing an ability to resist damage after a foreign object impact.

* * * * *